United States Patent
Karttunen et al.

[11] Patent Number: 5,888,609
[45] Date of Patent: Mar. 30, 1999

[54] PLANAR POROUS COMPOSITE STRUCTURE AND METHOD FOR ITS MANUFACTURE

[75] Inventors: Mikko Karttunen; Esa Suokas, both of Tampere, Finland

[73] Assignee: Valtion teknillinen tutkimuskeskus, Espoo, Finland

[21] Appl. No.: 589,312

[22] Filed: Jan. 22, 1996

Related U.S. Application Data

[63] Continuation of Ser. No. 78,185, filed as PCT/FI91/00393, Dec. 18, 1991 published as WO92/11126, Jul. 9, 1992, abandoned.

[30] Foreign Application Priority Data

Dec. 18, 1990 [FI] Finland .................................... 906234

[51] Int. Cl.$^6$ ............................... B32B 5/08; B32B 5/10; B32B 5/12; B32B 5/26

[52] U.S. Cl. .......................... 428/107; 428/137; 428/196; 428/197; 428/198; 428/373; 428/374; 428/375; 428/378; 428/392; 428/394; 428/408; 442/189; 442/192; 442/197; 442/198; 442/199; 442/200; 442/217; 442/239; 442/240; 442/246; 442/255; 442/308; 442/309; 442/310; 442/311; 442/318; 156/148; 156/311; 156/308.2; 156/308.4

[58] Field of Search ...................................... 428/107, 105, 428/113, 131, 137, 225, 246, 253, 288, 290, 296, 260, 289, 408; 156/148, 311, 308.2, 308.4; 442/32, 43, 45, 189, 190, 191, 192, 218, 220, 240, 241, 242, 248, 250, 251, 318

[56] References Cited

U.S. PATENT DOCUMENTS

| | | | |
|---|---|---|---|
| 3,914,494 | 10/1975 | Park | 428/247 |
| 3,994,762 | 11/1976 | Wrzesien et al. | 156/148 |
| 4,752,519 | 6/1988 | Boyer et al. | 428/137 |
| 4,842,933 | 6/1989 | Cizmecioglu | 428/378 |
| 4,906,506 | 3/1990 | Nishimura et al. | 428/113 |
| 4,983,451 | 1/1991 | Sugino et al. | 422/283 |
| 5,037,692 | 8/1991 | Miyazaki et al. | 428/252 |
| 5,149,583 | 9/1992 | Saarikettu | 428/253 |
| 5,180,633 | 1/1993 | Fourezon | 428/300 |
| 5,196,037 | 3/1993 | Rossi et al. | 51/293 |

FOREIGN PATENT DOCUMENTS

| | | |
|---|---|---|
| 0033244 | 8/1981 | European Pat. Off. . |
| 0133893 | 3/1985 | European Pat. Off. . |
| 0272083 | 6/1988 | European Pat. Off. . |
| 3408769 | 9/1985 | Germany . |
| 1392373 | 4/1975 | United Kingdom . |

*Primary Examiner*—Vivian Chen
*Attorney, Agent, or Firm*—Pollock, Vande Sande & Amernick

[57] ABSTRACT

A planar porous composite structure including a plurality of regular textile planar layers formed of continuous yarns. The layers are placed on top of each other to form a structure having two dimensions at right angles to each other and a third dimension perpendicular to them and defining a plane having a direction along the two dimensions. A plurality of openings extends through the layers. Each opening is defined by portions of the continuous yarns extending substantially in the direction of the plane and existing in the regular textile planar layers to make the planar layers regular in structure prior to placing them on top of each other. A plurality of passages extends entirely through the structure in a direction substantially perpendicular to the plane of the structure. The continuous yarns comprise both reinforcing fibers which form a reinforcing structure and a matrix material which forms a matrix which binds the layers together and also binds the portions of continuous yarns defining the openings together, thereby forming the passages and stiffening the structure.

17 Claims, 4 Drawing Sheets

PLANAR POROUS COMPOSITE STRUCTURE AND METHOD FOR ITS MANUFACTURE

This application is a Continuation of application Ser. No. 08/078,185, filed as PCT/FI91/00393, Dec. 18, 1991 published as WO92/11126, Jul. 9, 1992, abandoned.

FIELD OF THE INVENTION

The invention relates to a planar porous composite structure and to a method for manufacturing a structure of this kind.

BACKGROUND OF THE INVENTION

A composite may consist of matrix plastics and reinforcing fibers. The excellent strength values of structural composites are based on the high-module reinforcing filaments, such as glass, aramid and carbon fibers. At the present, primarily thermosetting plastics with good dimensional stability and chemical and thermal resistance are used as matrices of such composites. Epoxies dominate in structural, primary applications, for example, the aeronautic and space industries, whereas secondary applications for example in the automobile industry, involve also polyesters, phenols and vinyl esters. Themoplastic matrices will become more commonly used with the development of new technical polymers, such as polyphenylene sulphide (PPS), polyetherether ketone (PEEK) and polyther sulphone (PES), primarily furthered by the excellent physical and chemical properties of these plastics.

For the part of the reinforcement structures, the composites can be based either on continuous or staple fibers. The continuous fibers form a uniform, usually uniaxial network. The staple fibers are divided by length into short ones, i.e., $\leq 1 \ldots 3$ mm, and long ones, i.e. about $\leq 3 \ldots 10$ mm. In structural composites of continuous fibers, bearing a static and dynamic load, four basic factors are to be taken into account:

the fibers, the matrix, the ordering degree and orientation of the fibers, and the bonds between the fibers and the matrix.

The reinforcing fibers receiving the load determine the strength and rigidity of the structural composite. They also toughen the material by absorbing brittling energy, for example by a gliding mechanism between the binding surfaces. The matrix protects and supports the fibers, particularly in a pressing situation, as well as transmits the force on the piece from one fiber to another. In a situation of overloading, the matrix must be capable of transmitting the force between the broken filaments by means of shear between the material layers, so that the fibers could bear a traction load again. For this purpose, the fiber length must exceed a critical value. The quality of the composite is determined by how evenly the fibers are distributed in the structure and how well they are moistened by the matrix. The latter feature is essentially dependent on the fluidity, that is, the viscosity, of the matrix. The fibers can be oriented in three ways:

uniaxially, biaxially, i.e. in a plane, triaxially, i.e. in three dimensions.

In the case of structural composites, uniaxial continuous-fiber laminates represent the first group, woven fabrics the second group, and, for example braids the third group. In the end, it is the interface between the matrix and the fibers that determines how successful the composite is. It is the aim to create a strong bond between the fibers and the matrix in order to eliminate pores in the interface. In some cases, the fibers must be coated with a binding agent in order to secure the connection of the reinforcement to the matrix. Thus, there are, in fact, two interfaces in the structure, i.e. between the binding agent and the fiber and between the binding agent and the matrix.

The excellent mechanical properties of the structural composites are due to the continuous fibers, or filaments, which are usually 50 times stronger and 20 to 150 times more rigid than the matrix materials. Fibers with low density (1.44–2.7 g/cm$^3$) have high tensile strength and elastic modulus (3.0–4.5 GPa and 80–550 GPa, respectively), whereas the corresponding typical values for matrix polymers are 30–130 MPa and 2.0–4.0 GPa, respectively. During formation of the fibers, the strength of the material increases with the rise of the axial orientation of the crystals and with the decrease of defects (such as cracks and dislocations) in the microstructure. One-dimensional continuous-fiber composites are therefore much stronger in the longitudinal than in the transverse direction. It is an anisotropic material whose properties depend on the direction. The composite can thus be dimensioned according to the prevalent loading situation with a minimum material waste.

The properties of the composite are anisotropic, which is clearest in uniaxial structures. They give maximum tensile strength and modulus. As pieces are usually loaded by a three-dimensional stress field, the one-dimensional plates must be laminated on top of each other in order to achieve reinforcement in several directions. When the continuous fibers are oriented multiaxially in a plane, pseudoisotropic laminates are obtained. In three-dimensional basic coordinates, their stiffness in the xy-plane is comparable to that of aluminum mixtures, but the transverse tensile strength and elastic modulus as well as the shearing strength are low. This is due to the differences in the elastic coefficients between different layers, and, therefore, the load of the matrix varies in the direction of the thickness of the laminate (z). Thus the breaking of the structural composite is in most cases due to the gliding of layers in relation to each other.

For orientation of the continuous fibers in the structure in a desired way, thermosetting plastic matrices with low viscosity, such as epoxies and polyesters, and expensive manual methods, such as manual lamination and autoclaves, have generally been used in the production of complex composite pieces. The manufacture of thermosetting plastic composites has been slow and difficult, because special equipment is required for the storage and handling of a fluid matrix and the chemical cross-linking of the composites takes a long time. Other difficulties, and in some cases even barriers, for the future development of thermosetting plastic composites are caused by their brittleness and sensitivity to moisture as well as questions of occupational safety.

The use of thermoplastics as matrices for composites has been delayed by the view that it is impractical to moisten densely packed continuous fibers by viscose polymers. Also, there have been doubts on the succeeding of thermoforming in structures containing more than 60 vol-% inextensible fibers. However, the excellent physical properties of the new technical thermoplastics are gradually changing these attitudes.

The processing of thermoplastic composites is based on heat and pressure, so that they are considerably faster to manufacture than corresponding thermosetting plastic composites. Because thermoforming and/or pressure forming can be repeated several times, broken structures can be easily repaired. In addition, scrap structures and finishing waste can be used, for example e.g. as material for injection molding.

Thermoplastic staple fiber composites are manufactured by conventional melt working methods of polymers, for example by injection moulding, so that the orientation of the reinforcements cannot be fully controlled. In injection molding, for example, the orientation of reinforcing staple fibers and polymer molecules is influenced at the filling stage of the mold by a complex flow field with both a shearing and an extending component. When the short staple fibers are fluid-impregnated with a thermoplastic in the screw of the extruder, they are broken down in the strong shearing and extending flow because of a mutual attrition. The viscosity of technical thermoplastics being $10^3$ to $10^6$ times higher than that of thermosetting plastics, the polymer cannot fully moisten the whole surface area of the fibers. The reinforcements are thus rubbed further at the injection molding stage, resulting in an average fiber length of 180 to 200 $\mu$m in a finished product.

The published European Patent Application No. 272 083 discloses a method for manufacturing a porous piece for use as a reinforcing material by piling up fabrics formed of yarns comprising matrix and reinforcing fibers and by binding them together with the application of heat. The structure is used for thermosetting plastics applications. Further, from the published European Patent Application No. 133 893, a method is known for manufacturing shaped pieces reinforced with fibers in a similar way from woven or knitted fabrics piled on top of each other.

In the pieces presented above, however, all the structural possibilities have not been taken into account in the z-direction of the piece.

SUMMARY OF THE INVENTION

It is an aim of the present invention to present a composite structure characterized by simple manufacture and good strength in all directions. The invention is particularly related to a dimensionally stable planar structure, that is, a structure whose two dimensions (x and y at right angles to each other) are clearly greater than the third dimension (z) perpendicular to the m. It is a linear or curvilinear structure of about a standard thickness in the z-dimension which is at the same time light because of the pores in it and which, thanks to the pores, can be used for many purposes to replace corresponding porous structures of prior art where the pores or openings have been arranged by piling up layers of woven or knitted fabric or of braid. To achieve this object, the composite structure according to the invention is primarily characterized in that the openings of the structures forming the layers are aligned with each other relative to the plane of the layers, thus forming passages extending in z-direction of the structure. The reinforcing structure is formed by reinforcing fibers contained in the yarn serving as the structural part of the porous structure, and the matrix is formed by the matrix material contained in the yarn of the same structure, the matrix material also binds the layers formed by the structures lying on top of each other. The porosity of the structure can also be adjusted according to the form and dimensions of the structure, for example, according to the warp filling of the fabric or the loop type or loop size of a knitted fabric as well as according to the quality of the yarns bounding the openings.

In the structure, the matrix material forms a phase extending to all directions x, y and z, binding the reinforcing fibers of the porous structure together into a stiff structure.

The passages of the piece extending in the z-direction can be used for introducing material into the piece in different applications or for attaching other structural parts to the piece.

In the appended subclaims 2 to 11, some advantageous alternatives are presented for the composite structure according to the invention. The reinforcing fibers may consist of a continuous filament, such as glass, whereby the same yarn may also contain matrix material as a continuous filament, in which case the yarn can be a multifilament yarn, such as a yarn multiplied or doubled from monofilaments of different types. The continuous filament may also be coated with a layer forming the matrix material. Another alternative for the yarn comprising reinforcing fibers and matrix material is a yarn formed by spinning of reinforcing staple fibers and matrix staple fibers.

Instead of a composite piece formed by melting matrix material, the invention can also be applied to composite materials containing carbonized material, wherein the matrix material forms a material carbonized into amorphous carbon.

In particular by using knitted fabric as the structural layer, good formability of the piece at the manufacturing stage is achieved. The extensibility of knitted fabrics can also be utilized for obtaining other final, advantageous properties of the composite piece.

The method for manufacturing a composite structure, according to the invention, from one or several knitted, woven or braided fabric layers with thermoplastics as the matrix material is characterized in that the layers on top of each other are aligned with each other relative to the direction of their planes in such a manner that the openings in their structures are aligned with each other. The layers are pressed or allowed to settle by the effect of gravitation at the melting temperature of the matrix material into a desired form, whereafter the obtained piece is cooled down. By the combined action of pressure or gravitation and temperature, strong composite structures of desired shapes can be made, in which the aligned openings form passages in the z-direction of the structure. On the other hand, the method, according to the invention, for manufacturing a composite structure containing carbonized material from one or more knitted, woven or braided fabric layers containing matrix material of carbonizable material is characterized in that the layers aligned in the manner described above are carbonized by using heat in a protective atmosphere in an oven so that the carbonizable material is converted into amorphous carbon, whereafter the piece is cooled down.

The method according to the invention, based on the melting of thermoplastics, can be used for the manufacture of light, strong and stiff porous planar pieces with linear, curvilinear or spherical form which replace, for example, honeycomb forms. With a high fluid viscosity, the thermoplastics are advantageously in a fiber form or as coatings of reinforcing filaments in the yarns forming the layers. By bringing matrix and reinforcement units with a small cross-sectional surface close to each other, the flow distance of the thermoplastics is significantly reduced at the processing stage. The reinforcing fibers are thus moistened better and more evenly so that a composite piece can be manufactured by the application of heat and pressure, With both the matrix and the reinforcement being fibrous, it is possible to use them for making yarns for the structures described above (co- and intermingling). If filaments are used, they can be multiplied, doubled, or double-doubled. A multiplied yarn is composed of two or more filaments, both of a matrix and of a reinforcement unit comingled without a twist. By feeding the matrix and reinforcing fibers on different sides simultaneously, for example, to the needles of a flatbed or circular knitting machine, a structure is achieved that corresponds to a multiplied yarn. A doubled yarn is made by twining together two or more filaments. Two doubled yarns are further combined to form a double-doubled structure. The co- and intermingling of different fibers can be improved by the air-jet technique, but the flow value must be low to not damage the brittle reinforcements.

Apart from filaments, also staple fibers can also be used. Intermingling the matrix and reinforcing units in the staple form during spinning gives a more homogenous yarn than twisting them together as filaments. As the reinforcement and the matrix a re evenly distributed in the whole microstructure of the yarn, the axial and radial flow distance is considerably reduced at the heat pressing stage, i.e. the final composite piece is more homogenous. A commercial example of the said fiber type is the trademark "Heltra" (Heltra Division of Courtalds Advanced Materials).

In the method according to the invention, the starting materials can, apart from the hybrid yarns consisting of matrix and reinforcing fibers, be flexible melt, powder or solution impregnated reinforcing fibers. The melt impregnated reinforcing fibers are manufactured by a cable covering technique by feeding the reinforcing multifilaments through a crosshead die, wherein the melted polymer forms a coating on their surface. The powder impregnated reinforcement fibers are made by driving the reinforcements through powderized matrix particles which stick to the moving fibers, for example by static electricity. The path is next directed to a heated oven where the matrix polymer is melted on the surface of the fiber. Powder impregnated fibers can also be coated in a crosshead die by a melted plastics that forms a coating protecting the loose particles when cooled. A commercial example is the FIT fibers (Fiber Impregnated Thermoplastics) by the French company Atochem. In all the cases above, the melted plastics can be replaced by a possible corresponding solution (solution impregnation).

Any of the above-mentioned flexible hybrid yarns formed by a thermoplastic matrix and a reinforcement that can be knitted, woven, braided or processed by another textile manufacturing method into a product with a wide surface area can be used to manufacture a light, strong and stiff composite structure with a regular porosity. By laminating the formable blanks, preferably knitted fabrics (flat, interlock, rib-knit, Raschel-technique based, etc.), on top of each other, they can further be pressed by heat and a high pressure (>20 bar), dependent on the bonding and the material, into a porous cellular plate. Instead of overpressure, vacuum or underpressure can be used, or the softened plate can be left to bend by gravitation according to the outlines of the mold. The obtained thermoplastic structure can be easily formed into complex geometrical surfaces. If the matrix polymer is crystalline or semicrystalline, the strength, stiffness and toughness of the cell can be controlled by means of the process parameters particularly the cooling rate. With a low rate of cooling (<1° C./min, for example PEEK), the matrix is almost completely crystallized to make the cellular plate stiff and brittle. The toughness, that is, the shearing strength of the structure, is increased by raising the rate of cooling (>1000° C./min, for example PEEK), because the matrix becomes more amorphic. The choice of the thermoplastics as the matrix can thus be used to regulate the final properties of the products as desired.

Knitted fabric is an advantageous material for the structure according to the invention. At the heat pressing stage, the fabric layers are submitted to so high a normal force (direction z) that the fabric is extended to the extreme in the planar direction (plane xy). As a result, the loops of the fabric are opened to make a net structure.

By the method according to the invention, the thermoplastic matrix can be particularly evenly distributed in the reinforcement, which is not possible with the conventional melt working methods, such as injection molding. Using a thermoplastic matrix, the reinforcements can be locked in optimal locations and positions as far as the strength calculations are concerned, with regard to the influencing stress field, as well as in shapes of high geometric complexity, which is not possible with fluid thermosetting plastics. The invention makes possible the manufacture of pieces with very wide surfaces and high complexity.

The cellular structure according to the invention can be produced in a continuous process by present mass production methods. By driving a flexible "prepreg" semiproduct of several layers, comprising reinforcing fibers and thermoplastic matrix, through a heating zone, it is possible to form it by under- or over-pressure into a shaped product. A production line for a cellular structure with continuous action thus comprises, for example, of feeding the reinforcing and matrix, fibers, knitting, a heating and pressure zone, and a finishing stage. A flexible or stiff prepreg cell can also be stored in prefabricated form and transferred e.g. to a wholly another site for the final manufacture of the product.

For matrix materials, all thermoplastics are suitable that can be melted by heat and pressed into a shape by using pressure. The mechanical properties of the final composite piece are best when new technical thermoplasts are used as matrices, such as polyether ether ketone (PEEK), polyphenylene sulphide or thermotropic fluid crystal polymers. Suitable reinforcement fibers include glass, aramid, carbon, ceramic, stone and LCP fibers, which can be staple fibers or mono- or multifilament fibers.

The composite structures according to the invention are not limited to those formed by melting a thermoplastic matrix only, but also a corresponding stiff ceramic structure can be manufactured by carbonization. In this case, the matrix used may consist of, for example, phenol, viscose or polyacrylnitrile fibers, and the reinforcement used may consist, for example, of ceramic, mineral or stone fibers. The heat pressing is thus replaced by an oven phase in a protective atmosphere, at which the matrix material of the knitted or woven fabric under a normal pressure is carbonized, carbon-carbon binds are formed between matrix materials of adjacent yarns, and the carbonized matrix material finally forms a continuous, uniform matrix of amorphic carbon in the directions x, y and z. If the matrix and the reinforcement are both of the same material to be carbonized, a carbon/carbon composite is produced at the oven phase in which the components retain their original shape. As an example of such a composite, a product made of hybrid yarn can be mentioned, in which viscose fiber serves as the reinforcement and polyacryl nitrile as the matrix.

A carbonizable thermoplastics, such as polyacrylnitrile, melts with the rise of the temperature at the beginning of carbonization and forms a continuous matrix as early as at this stage. On the other hand, when prepolymerized phenol comprising a cross-linking agent is used, the cross-linking agent is active and binds the matrix in a similar way uniformly in the starting temperature of the carbonization.

As the fabrics in the invention, any knitted fabric can be used, such as flat, rib-knit or interlock fabric etc. according to the shaping properties and strengthening effect desired. The strengthening effect of a knitted fabric can be improved by a so-called inlay technique. As the deformation degree of the fabric does not depend on the extensibility of the reinforcement fiber but on the macrostructure, a fabric made of hybrid yarn (matrix and reinforcement fiber in the same yarn) represents a flexible semiproduct, i.e. a prepreg material. It is thus possible by means of the type of knitted fabric to regulate the macroscopic deformation degree and simultaneously the strengthening and shaping behaviour of the semiproduct as wall as of the final product. The choice of different loop sizes and densities can be used to produce cellular structures with different weights. Because the knit-based cell according to the invention can be easily shaped, it can be used as a semiproduct to make, for example spherical pieces which are heat-pressed into the final product for example by elastic rubber coatings.

By covering the knitted or woven fabrics with plastic films, a very stiff and strong surface/core/surface structure, i.e. a sandwich structure, is produced in heat pressing. In a loading situation, the oriented surface receives either tensile or compression stress, whereas shearing force is received by the core according to the invention. Thanks to the tough thermoplastic matrix, the said light cell can bear very high shearing stresses, which can be further improved by choosing e, g. a UHMWPE, lyotropic or thermotropic LC fiber as the reinforcement.

BRIEF DESCRIPTION OF THE DRAWINGS

The invention is further described in the following by reference to the attached drawings in which.

DETAILED DESCRIPTION OF THE PREFERRED EMBODIMENTS

Figure 1:
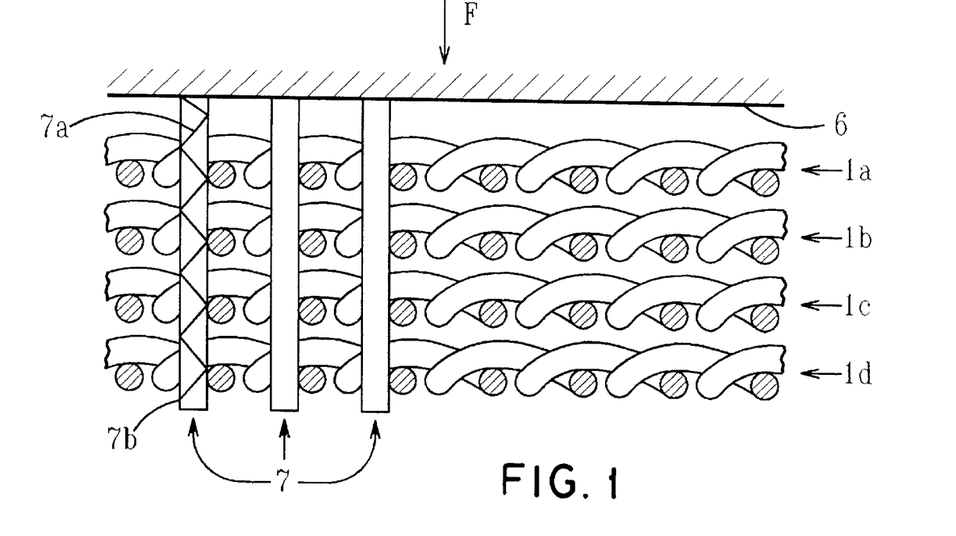
FIG. 1 shows the production stage of a structure according to the invention before forming the final product.

FIG. 1 shows the situation before the pressing into a final product as a cross-sectional view perpendicular to the direction of the plane of the product. The planar structure 1 is formed by layers 1a, 1b, 1c and 1d consisting of simple knitted fabrics piled on top of each other. The openings 2 formed by loops in the fabric layers 1a, 1b, 1c and 1d are placed so as to be aligned with each other when seen in a direction perpendicular to the plane of the product. This is achieved by having pins 7 protruding in the perpendicular direction from a press surface 6 of the press organ which penetrate the loops in the layers situated on top of each other. In combination with pressing, the pins 7 can also expand in their lateral direction according to the extension of the knitted fabrics 1, because they comprise each a spring 7a, coated with a flexible wall material 7b, extending in the longitudinal direction inside the pin. The pins 7 can also be formed to have a hollow inside, in which case their wall 7b is flexible. The pins can thus be made to expand in the lateral direction by means of air conducted inside them. The orientation is particularly easy to make in the knitted fabrics in which all the loops have a regular shape and size. The openings on top of each other thus form passages extending through the layers in the z-direction. In case the ends of the pins 7 protrude from the other side of the structure 1, there are openings in the opposite press surface to receive the pins.

In the embodiment according to FIG. 1, the fabrics are piled so that their wales are parallel in the layers situated on top of each other. However, it is also possible to use cross piling so that the wales of the layers are at right angles to each other. The wales can also be arranged at angles, for example, at angles of 45° or 60° to each other, in which case the isotropic properties are improved. The yarns forming the layers are formed of any hybrid yarn 3 mentioned above. Thus, the structure of the knitted fabrics must be such that certain regularly situated loops in the layers situated on top of each are will be regularly aligned so that the aligning means can penetrate the passages formed by them in the z-direction.

The structure according to FIG. 1 is submitted to force in the direction of the arrow F, that is in the direction perpendicular to the plane of the structure. With this force, the structures are brought closer to each other. By the simultaneous application of heat, the matrix material is melted into a continuous matrix phase in the direction perpendicular to plane of the product, binding together the layers 1a, 1b, 1c and 1d lying on top of each other. The knitted fabrics can also be formed by knitting together yarn of only matrix and yarn of only reinforcement. Because of the structure of the knitted fabric, the matrix is also in this case transformed into a continuous phase extending through the whole structure.

Figure 2:
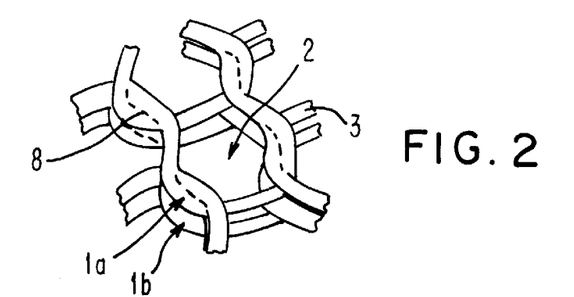
FIG. 2 shows a detail of the final structure according to FIG. 1.

FIG. 2 shows a detail of the final structure. The loops 2 of the knitted fabric have been extended during pressing into polygonal structures. The point at which the matrix of the hybrid yarn 3 has bound the different adjacent yarn sections surrounding single loops, is denoted by the reference numeral 8. As shown in the figure, a honeycomb structure comprising hexagonal openings is achieved by the layers on top of each other. The openings formed by loops 2 on top of each other in aligned positions form passages extending through the piece in the z-direction. Thanks to the gaps remaining between the separate knitted fabric layers 1a, 1b, the walls of the passages are porous. This porosity can be adjusted by pressure.

Figure 3:
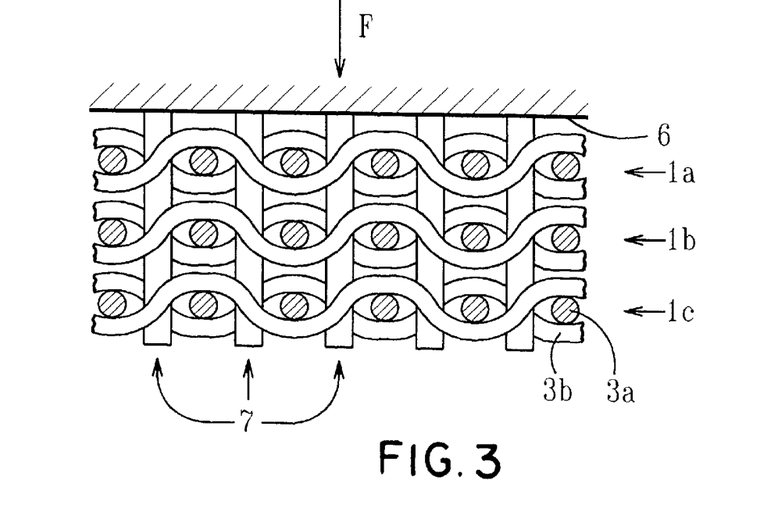
FIG. 3 shows an alternative for the method according to FIG. 1.

FIG. 3 shows a situation similar to that of FIG. 1, in which a woven fabric is used as the layers 1a, 1b, 1c and 1d. The weft and warp yarns 3a, 3b of the woven fabric are advantageously both of hybrid yarn, in which case they can be of the same or of different hybrid yarn. By application of heat and pressure, the structure according to FIG. 2 can also be formed into a final stiff product of permanent shape by the method described above. The openings 2 for med by the weft and warp yarns are aligned with each other by the aligning means 7 similar to those in FIG. 1, and the piece is formed as described above. The aligning means can be laterally non-expandable.

The weft yarns 3a and the warp yarns 3b can also be arranged so that one of them consists solely of matrix material and the other of reinforcing material. Thus it is advantageous to pile the fabric layers on top of each other so that the reinforcing yarns are positioned in different directions in different layers. This is advantageous for achieving isotropicity, also in the case where both the weft and the warp yarns of the fabrics consist of the same or different hybrid yarn.

Figure 4:
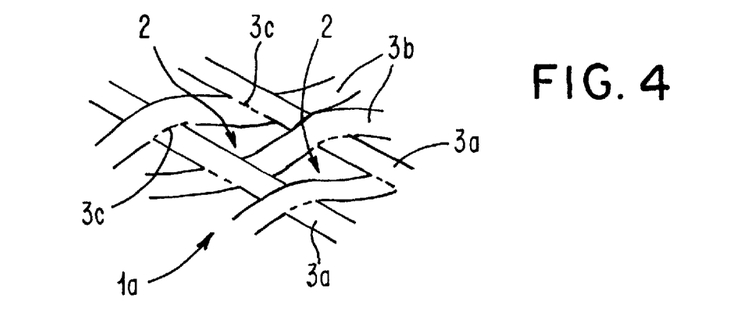
FIG. 4 shows a detail of the final structure according to FIG. 3.

FIG. 4 shows a structure corresponding to FIG. 2 with a woven fabric or a braid. The openings 2 between the weft and warp yarns or between the crossing braided yarns form quadratic or skew openings in the final product. The hybrid yarns 3 serving as the weft and warp yarns or as the braided yarns and forming the yarn sections surrounding the single openings, are merged to each other by the matrix in point 3c.

Figure 5:
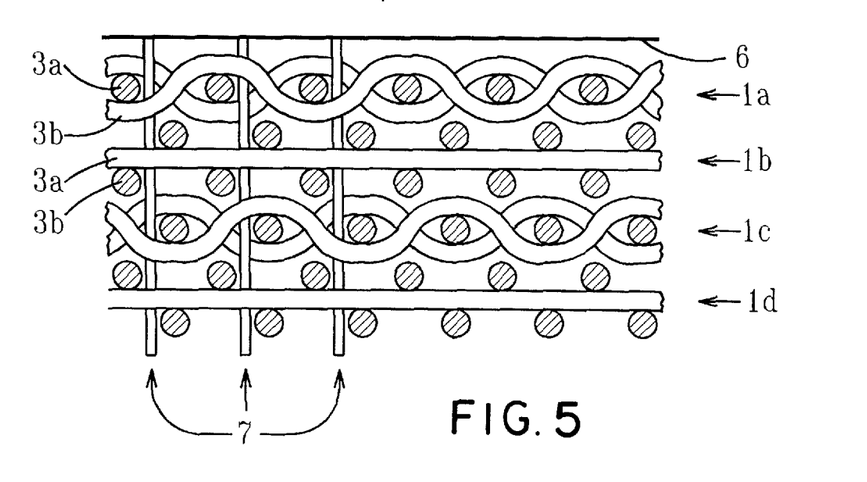
FIG. 5 shows an alternative for the method as shown in FIG. 3.

FIG. 5 shows a structure in which the fabric layers 1a, 1b, 1c and 1d are piled on top of each other so that the weft and warp yarns 3a, 3b run in crosswise directions in the layers on top of each other. Furthermore, the openings formed by the weft and warp yarns in two adjacent layers are always so positioned that the crossing point of yarns 3a, 3b in one layer 1a is in the middle of the opening of the other layer. Through the smaller openings thus formed, it is possible to push the aligning means 7 through the layers. It is also not necessary to have an aligning means for each opening, but they are to secure that a sufficient number of passages in the z-direction will be present evenly everywhere in the structure.

Figure 6:
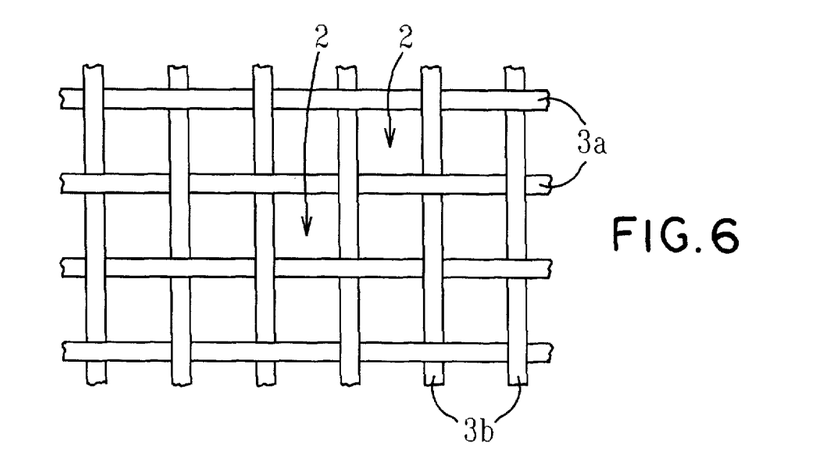
FIG. 6 shows a planar view of the structure according to FIG. 3, FIGS. 7a and 7b show as planar views some alternatives for the structure according to FIG. 6.
Figure 7A:
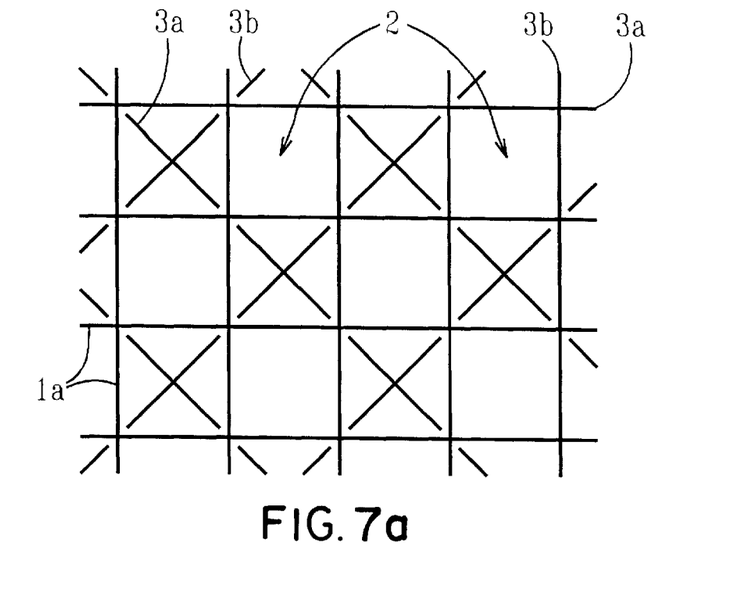
Figure 7B:
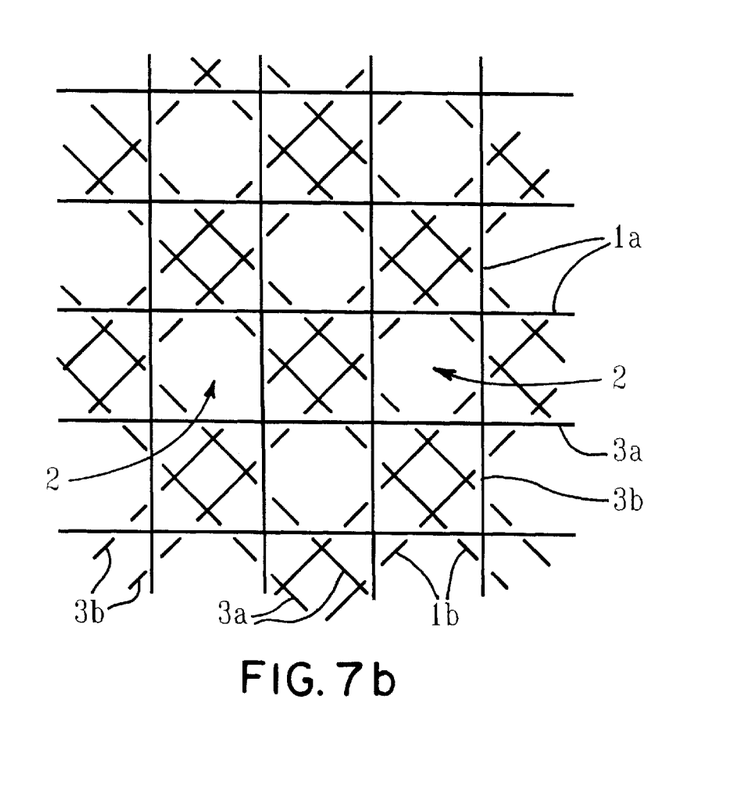

FIG. 6 shows a structure according to FIG. 3 in the z-direction, in other words, in the direction perpendicular to its plane. As shown in FIG. 6, the woven fabric is, relatively loose. The size of the openings 2 is, therefore, dependent on the width of the aligning means, but it should be noted that the aligning means 7 can be as thin as needles. FIGS. 7a and 7b show structures piled crosswise as seen in the z-direction, In FIG. 7a, two fabric layers 1a and 1b on top of each other have openings of different sizes, wherein the fabric with a larger opening size is at a 45° angle and its weft and warp yarns 3a, 3b run overlapping the crossings of the weft and warp yarns of the other fabric and cover with its crossings every other smaller opening. The aligning means can be inserted through the layers at the openings 2 left free. FIG. 7b shows how the weft yarn pairs and the warp yarn pairs of the other layer 1b are used to give octagonal shapes to the openings 2 left free by positioning the layer at a 45° angle.

The alternative of woven fabrics includes also knitted bi- and multiaxial fabrics (so-called LIBA process), which may also include yarns at other than right angles to each other In such fabrics, the yarns do not run interlocked in a manner of weft and warp yarns but consist of layers knitted on top of each other where the yarns always run in a certain direction.

Furthermore, it is possible to use a braid as an initial structure, in which case the structure may be formed of one or several braided layers analogically to a woven fabric.

Figure 8:
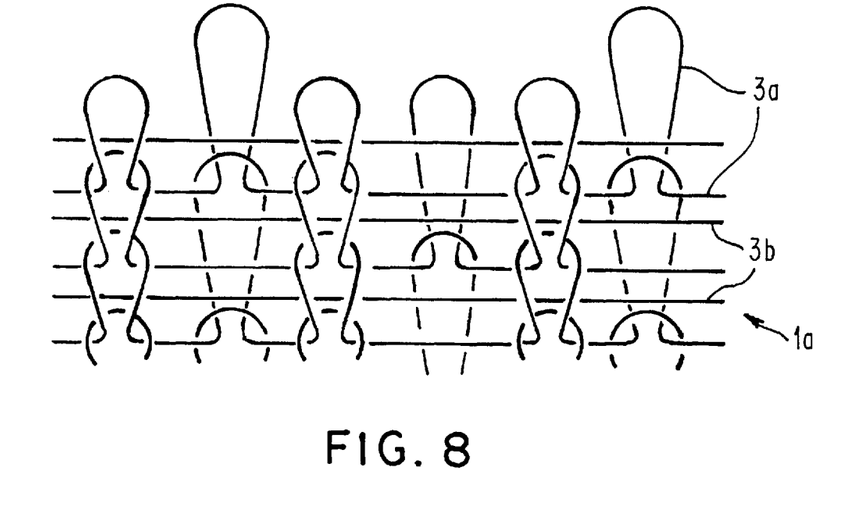
FIG. 8 shows a planar view of an alternative for the structure according to FIGS. 1 and 2.

FIG. 8 shows an alternative knitted layer 1a that can be used. The figure shows the inlay yarns 3b arranged to run mainly in one direction within the knit, with the function of strengthening the structure. The inlay yarns can be of a different type than the yarns 3a forming the knit. The knitted fabrics can be piled on top of each other so that the aligning means 7 can be inserted through the layers at least at some loops 2 between the inlay yarns 3b. With the same requirements, the weaves can be piled also crosswise, in which case also the inlay yarns run crosswise.

Figure 9:
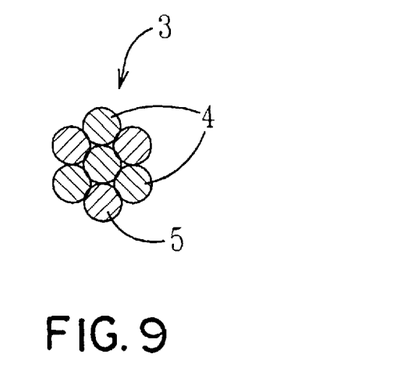
FIG. 9 shows a yarn type used in the structures forming the layer/layers.
Figure 10:
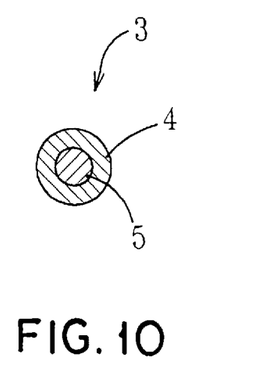
FIG. 10 shows another yarn type used in the structures forming the layer/layers.

FIG. 9 shows a longitudinal cross-sectional view of one type of yarn possible to be used in the structure layers 1 with openings. The yarn is a multiplied yarn consisting of filaments 4 of matrix material and of filaments 5 of reinforcing material. FIG. 10, in turn, shows a continuous reinforcing filament 5 as the core of a yarn 3, covered by a continuous layer 4 of matrix material in any manner described above.

For obtaining good strength, the content of the reinforcing fibers in the final product should be more than 10 vol-%, an optimal content being 50 to 60 vol-%.

Several layers can be piled on top of each other also by folding different sections of one and the same blank instead of forming the layers of separate pieces.

APPLICATIONS

A cellular structure according to the invention is applicable to secondary and primary parts of transport vehicles, such as automobiles, ships, aircraft and spacecraft, the division depending on the choice of matrix and reinforcing materials. The secondary parts include, for example, different coverings and claddings, whereas the primary parts include, for example, sandwich beams and profiles. The corresponding products can also be used for the needs of construction and process equipment industry. The cell according to the structure can be used to reduce the mass of inertia to a considerable extent, and consequently important application fields include moving machine parts, such as the legs of a robot and the needling plates of textile manufacturing machines. Thanks to its light weight, the cellular plate can also be applied as a support structure for satellite antennas.

Other uses for a knitted fabric honeycomb include different filters for gases, fluid substances and/or particles (air and water protection). When the continuous reinforcing fiber is made of a metal, an electric current can be lead into it so that the positively or negatively charged particles can be made to stick to the cavities of the honeycomb. The porous structure with a large inner surface area can also be used, for example, as a culture medium for bacteria and plants. Due to the large surface area of the cellular structure, moisture from the air is condensed in it with changes in the temperature. This property can be utilized, for example, for obtaining water in desert conditions. The large surface area can also be used for storing solar radiation energy, in which case the reinforcement must be of thin metal conducting electricity. Hence, solar cell elements must be placed in the loop openings, or the matrix, e.g. organic conducting polymers, must be capable of transforming radiation energy into an electric current.

The applications mentioned above are based on planar knits, but if circular knits or tubular braids are used, tubular cellular structures can be manufactured. The matrix of a flexible semiproduct or of cylindrical semiproducts laminated on top of each other must first be melted using a cylindrical heatable metal mold, whereafter it is cooled down at a suitable, rate. The obtained tubular cellular plates are suitable, for example, for surfaces of bearings or for different flow filters and flow separators. By choosing either a technical heat-resistant (e.g. polyimide sulphone) or a carbonizable (e.g. polyacryl nitrile) polymer for the matrix, and, for example, a ceramic fiber for the reinforcement, it is possible to quickly manufacture filters and insulators for chimneys, for example. By feeding a blown film or films onto a cylindrical cell structure, for example, by coiling or by extrusion technique, a surface/ core, in other words a sandwich structure can be produced, applicable, for example, to construction material for masts, support bars and chimneys. If the cell matrix and the polymer of the film to be added are of the same material, such as polyphenylene sulfide (PPS), they are welded strongly together at the processing stage, i.e. there is good adhesion at the interface.

The cellular structure with openings according to the invention can be used as a three-dimensional reinforcing structure by impregnating the openings, for example, by pressure with a thermosetting plastics containing glass fiber. Alternatively, long-fiber reinforced thermoplastic granulate melted by an extruder can be fed using, for example, a special nozzle or hot melt technique, in which case the fluid polymer with its fibers is guided to the loop openings for example, by means of rolls. The passages extending in the z-direction formed by the openings 2 evenly distributed in the direction x and y are thus useful for the distribution of the polymer in the structure. The obtained three-dimensional laminate is finally cooled under pressure either in cylinders or in a belt press. If the honeycomb and the matrix of the granulate to be added are of the same material, e.g. polypropene, they are strongly welded together at the processing stage, i.e. there is good adhesion at the interface. Thus, the product according to the invention can act as an intermediate product in the manufacture of composite structures, thus forming the reinforcement (the components of the intermediate product can thus be called reinforcement 1 and matrix 1), and the matrix (so-called matrix 2) of the final product. The final product may contain reinforcement (so-called reinforcement 2), which can be arranged into the openings of the product. The reinforcement 2 may consist of continuous fibers or microspheres. Thanks to the passages formed by the openings 2, it is possible to have reinforcement not only in the direction x and y but also in the direction z.

EXAMPLE OF AN EMBODIMENT

Hybrid yarn consisting of polyamid and E glass and with a fineness of about 167 tex was knitted by a flat-bed knitting machine Stoll UFD with an interlock setting, giving a grammage of about 936.0 g/m$^2$. Pieces of 300×300 m were cut from the knit and four of them were piled on top of each other so that the orientations of the different layers in the machine direction coincided. The melting point of the matrix polymer used being 256° C., the laminate blank was compression molded into a porous cellular plate in a temperature of between 264° and 267 ° C., which was the range set for the machine. At the processing stage, the following profile was followed for time, pressure and temperature:

5 min, 100.0 kN, 265° C.
5 min, 150.0 kN, 265° C.
8 min, 100.0 kN, 264°–267° C.
2 min, 150.0 kN, 264°–267° C.

Finally, the piece was air cooled under a weight of 30 kg. The thickness of the laminate was about 6 mm and the density with pores was 500 kg/ m$^3$. Samples of the cellular plate were sawn for tensile strength and bending tests with the following measurements:

tension rods:
  width: 20.0±0.5 mm
  length: 200.0±1.0 mm
bending rods:
  width: 10.0±0.5 mm
  length: 100.0±0.5 mm The tensile test was performed according to the standard ISO 3268: 1978(E) and the three-point bending test according to the norm ASTM D 790 M-84. The results based on five (5) parallel samples are as follows:

tensile strength: 21.3±1.3 MPa
break elongation: 3.2±0.2%
Young's modulus: 1114.0±75.0 MPa
bending strength: 29.3±1.9 MPa
bending elastic modulus: 1546.0±60.9 MPa Because of the porosity of the cellular plate according to the invention, the tests performed do not characterize it very well, because the cross-sectional measures according to the dimensions of the rods contain parts of no mass. By dividing the results above by the density of the rods, the following values are obtained:

tensile strength: 42.6 kN/(kg/m)
Young's modulus: 2228 kN/(kg/m)
bending strength: 58.6 kN/(kg/m)
bending elastic modulus: 3092 kN/(kg/m)

We claim:

1. A planar porous composite structure, comprising:
    a plurality of regular textile planar layers selected from the group consisting of knitted, woven and braided layers, said layers being formed of continuous yarns, said layers being placed on top of each other to form a structure having two dimensions at right angles to each other and a third dimension perpendicular to them and defining a plane having a direction along said two dimensions;
    a plurality of openings extending through said layers, each of said openings being defined by portions of said continuous yarns extending substantially in the direction of said plane and existing in the regular textile planar layers to make the planar layers regular in structure prior to placing them on top of each other;
    a plurality of passages extending entirely through said structure, said passages having walls and comprising at least a portion of said openings in each of said layers aligned with each other, said passages extending through said structure in a direction substantially perpendicular to the plane of the structure;
    a reinforcing structure formed by reinforcing fibers included in said continuous yarns; and
    a matrix formed by matrix material also included in said continuous yarns, said matrix binding together said portions of said continuous yarns defining said openings and binding said layers directly together by simultaneously forming the walls of the passages with said continuous yarns forming said side walls extending in the direction of said plane and substantially perpendicularly to the passages, and simultaneously stiffening said structure.

2. A planar porous composite structure according to claim 1, wherein said regular textile planar layers comprise knitted layers, said passages being formed by loops of said knitted layers.

3. A planar porous composite structure according to claim 1, wherein:
    said regular textile planar layers comprise a woven fabric including weft and warp yarns; and
    said passages are formed by openings between said weft and warp yarns.

4. A planar porous composite structure according to claim 1, wherein said layers comprise knitted layers, and said openings comprise loops which are extended from a shape in which they are originally formed.

5. A planar porous composite structure according to claim 1, wherein said continuous yarns are hybrid yarns comprising both reinforcing fibers and matrix.

6. A planar porous composite structure according to claim 5, wherein said continuous yarns comprise a continuous matrix filament and reinforcing filament.

7. A planar porous composite structure according to claim 5, wherein said continuous yarns comprise a reinforcing filament and a matrix coating on it.

8. A planar porous composite structure according to claim 1, wherein said reinforcing fibers are continuous filaments.

9. A planar porous composite structure according to claim 8, wherein said continuous filaments are glass.

10. A planar porous composite structure according to claim 1, wherein said continuous yarns comprise reinforcing staple fibers and matrix staple fibers spun together.

11. A planar porous composite structure according to claim 1, wherein said matrix material comprises thermoplastics, and said continuous yarn portions defining said openings are bound together and the structure is stiffened by said matrix material melted in heat treatment and solidified.

12. A planar porous composite structure according to claim 1, wherein said matrix material comprises a material carbonized in heat treatment into amorphous carbon, said yarn portions are bound together and the structure is stiffened by said amorphous carbon.

13. A planar porous composite structure according to claim 12, comprising a carbon/carbon composite, and wherein said reinforcing fibers comprise a material carbonized in heat treatment into amorphous carbon.

14. A planar porous composite structure according to claim 1, wherein said regular textile planar layers comprise knitted layers, wales of said knitted layers run crosswise with respect to each other in the layers placed on top of each other.

15. A planar porous composite structure according to claim 1, wherein the walls of the passages are porous as a consequence of gaps left between said layers.

16. A method of manufacturing a planar porous composite structure, said method comprising the steps of:

providing a plurality of regular textile planar layers selected from the group consisting of knitted, woven and braided layers, said layers being formed of continuous yarns, a reinforcing structure formed by reinforcing fibers included in said continuous yarns, and a matrix formed by a thermoplastic matrix material also included in said continuous yarns;

said regular textile planar layers having each a plurality of openings extending through said layers, each of said openings being defined by portions of said continuous yarns and making the layers regular in structure;

piling said regular textile planar layers on top of each other to form a structure having two dimensions at right angles to each other and a third dimension perpendicular to them and defining a plane having a direction along said two dimensions, said continuous yarns extending in the direction of said plane in said structure;

forming a plurality of passages having walls and extending entirely through said structure in a direction substantially perpendicular to the plane of the structure by aligning said layers with respect to each other so that at least a portion of said openings in each of said layers are aligned with each other;

joining said portions of said continuous yarns defining said openings and directly joining said layers by heating said matrix material to a melting temperature to allow the walls of the passages to be formed simultaneously by said continuous yarns extending in the direction of said plane and substantially perpendicularly to the passages, thereby simultaneously stiffening said structure;

forming said matrix material into a desired shape; and cooling said structure.

17. A method of manufacturing a planar porous composite structure, said method comprising the steps of:

providing a plurality of regular textile planar layers selected from the group consisting of knitted, woven and braided layers, said layers being formed of continuous yarns, a reinforcing structure formed by reinforcing fibers included in said continuous yarns, and a matrix formed by a matrix material carbonizable in a heat treatment into amorphous carbon, said matrix material also included in said continuous yarns;

said regular textile planar layers having each a plurality of openings extending through said layers, each of said openings being defined by portions of said continuous yarns and making the layers regular in structure;

piling said regular textile planar layers on top of each other to form a structure having two dimensions at right angles to each other and a third dimension perpendicular to them and defining a plane having a direction along said two dimensions, said continuous yarns extending in the direction of said plane in said structure;

forming a plurality of passages having walls and extending entirely through said structure in a direction substantially perpendicular to the plane of the structure by aligning said layers with respect to each other so that at least a portion of said openings in each of said layers are aligned with each other;

carbonizing said layers using heat in a protective atmosphere in an oven so that said carbonizable material is transformed into amorphous carbon to allow the walls of the passages to be formed simultaneously by said continuous yarns extending in the direction of said plane and substantially perpendicularly to the passages; and cooling said structure.

* * * * *